L. L. UPSHAW.
COTTON HARVESTER.
APPLICATION FILED AUG. 26, 1912.
1,079,585.
Patented Nov. 25, 1913.
5 SHEETS—SHEET 3.
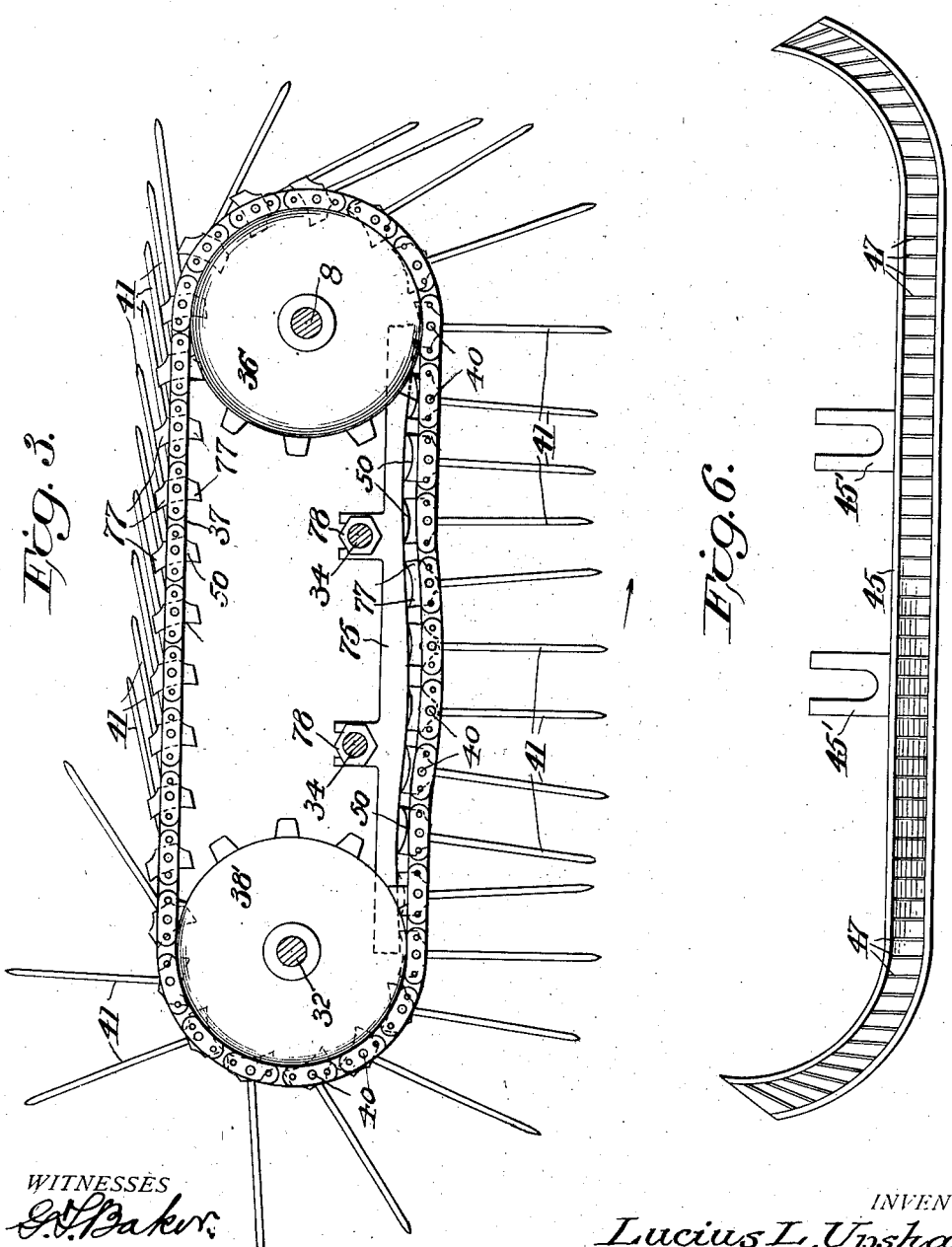

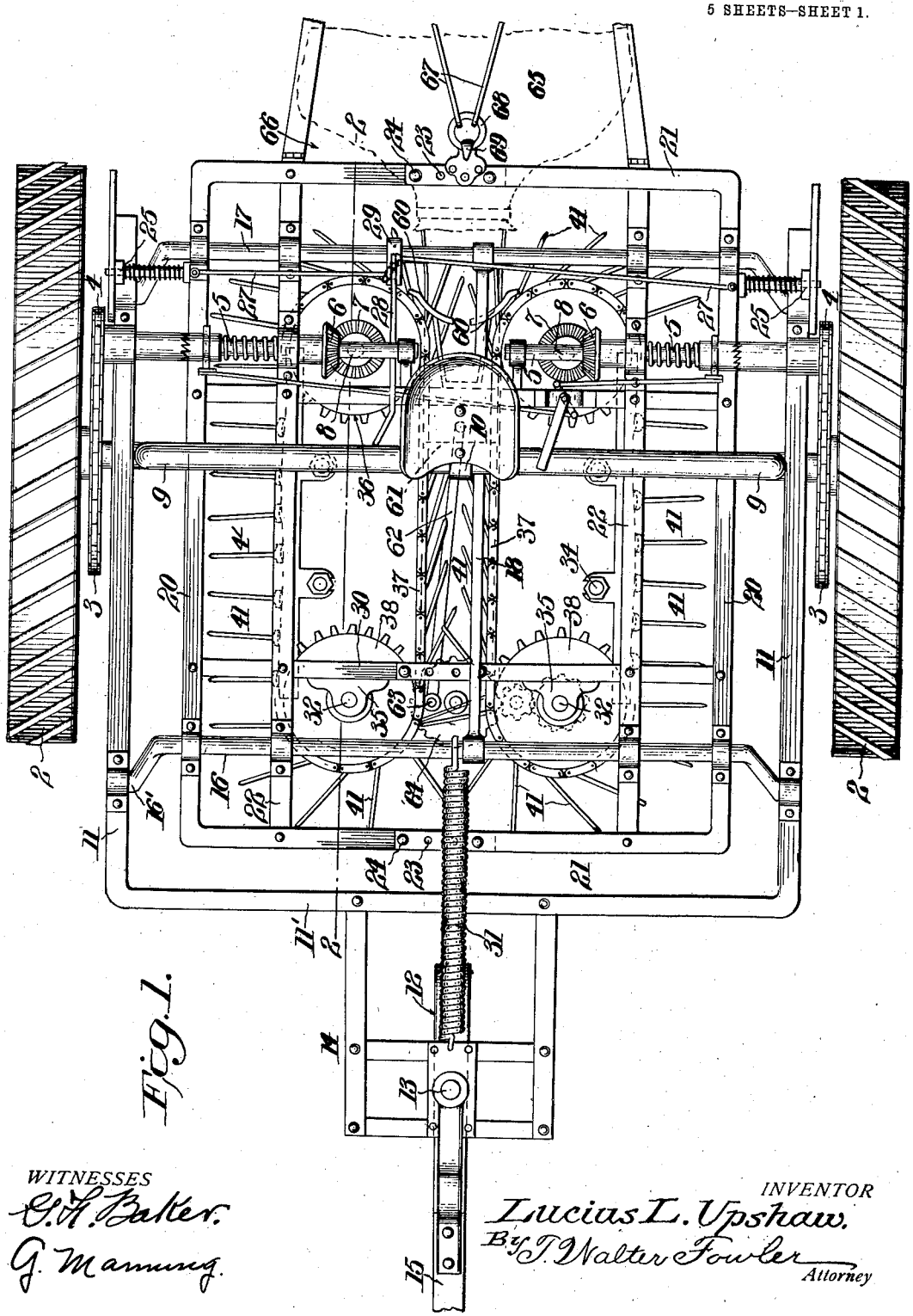

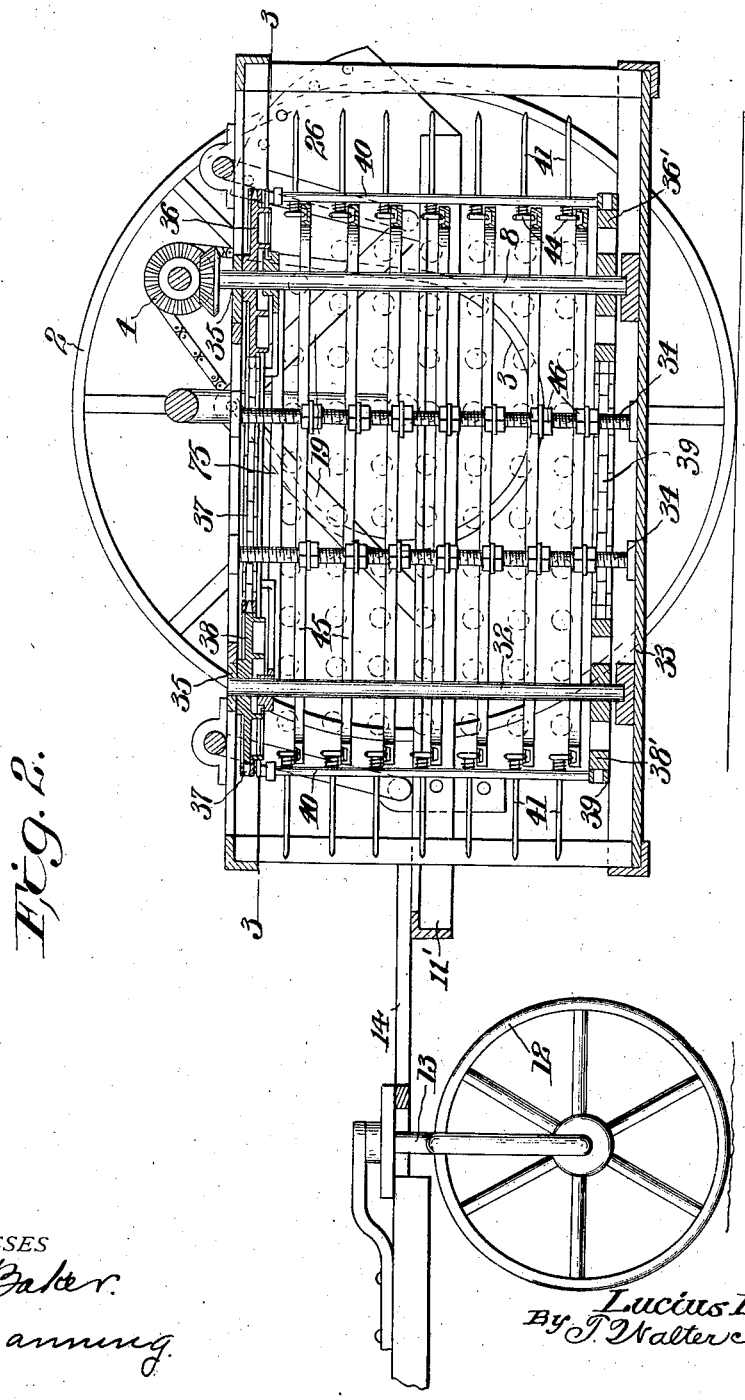

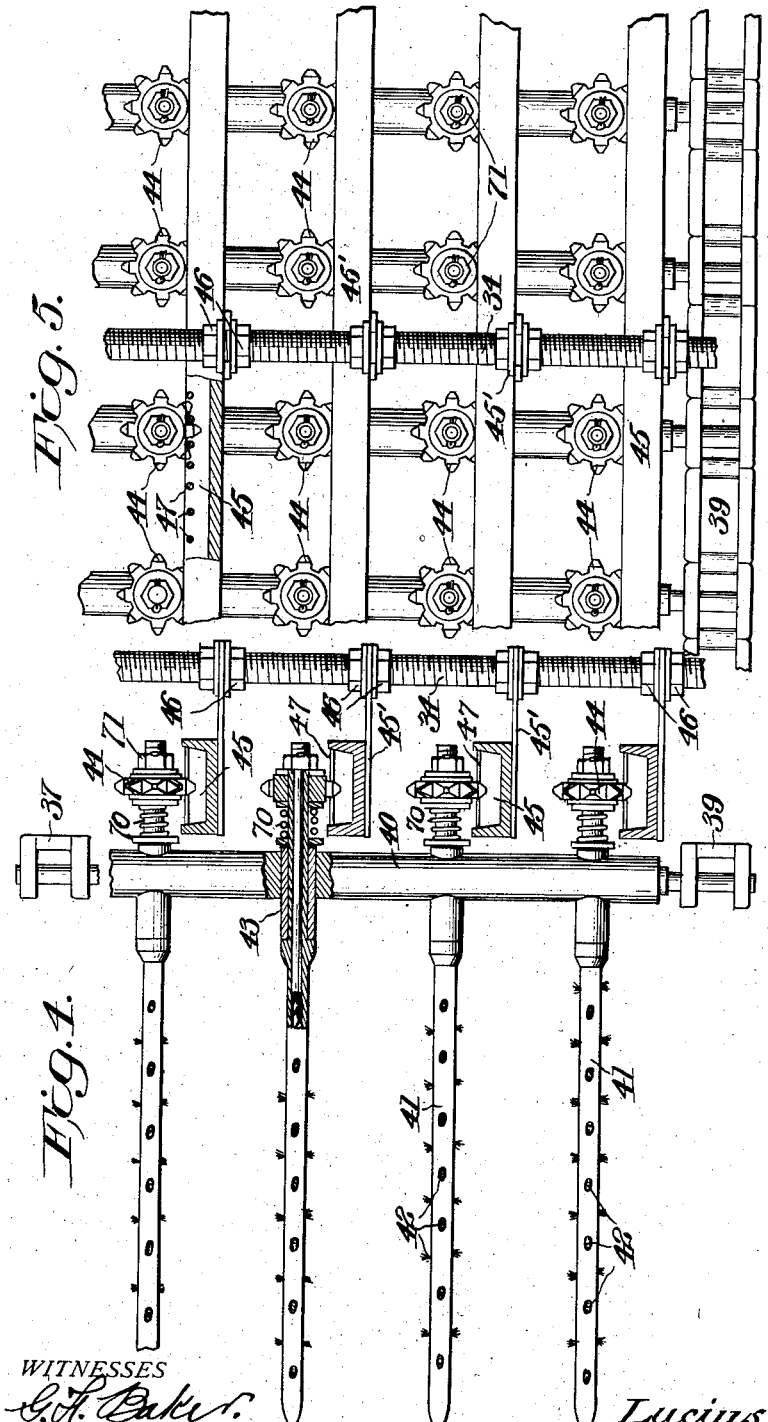

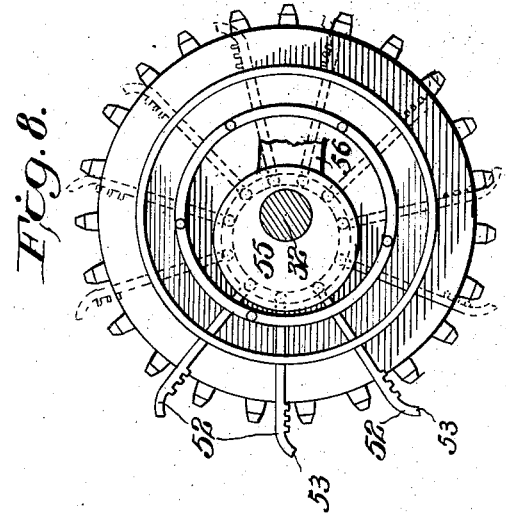
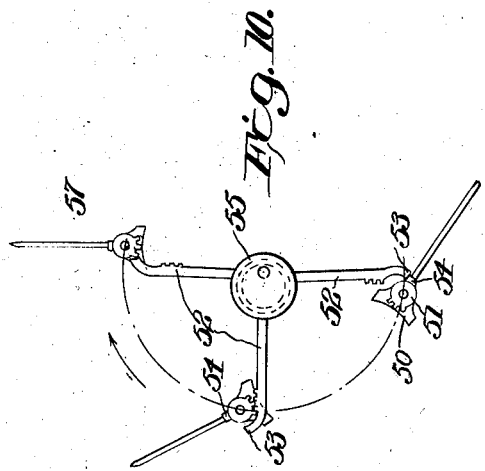
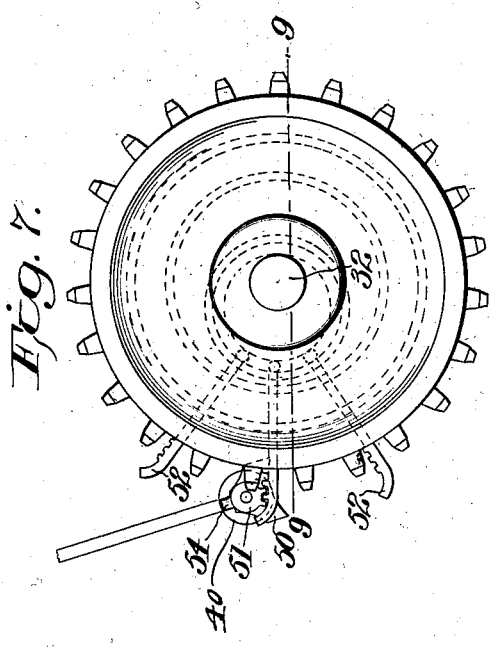
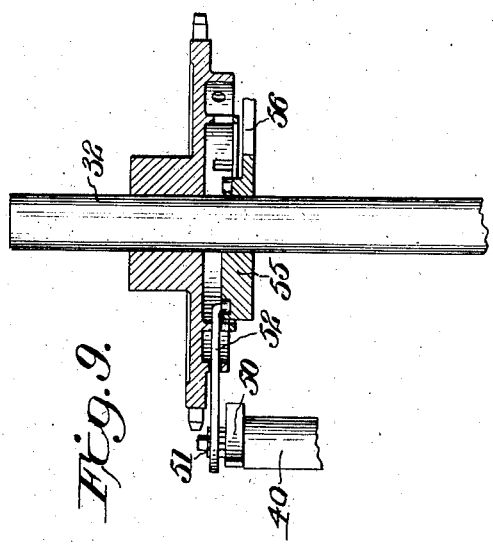

UNITED STATES PATENT OFFICE.

LUCIUS L. UPSHAW, OF DENISON, TEXAS, ASSIGNOR OF ONE-FIFTH TO GODWIN L. BLACKFORD AND ONE-FIFTH TO PATRIC H. TOBIN, BOTH OF DENISON, TEXAS.

COTTON-HARVESTER.

1,079,585. Specification of Letters Patent. Patented Nov. 25, 1913.

Application filed August 26, 1912. Serial No. 717,028.

*To all whom it may concern:*

Be it known that I, LUCIUS L. UPSHAW, a citizen of the United States, residing at Denison, in the county of Grayson and State of Texas, have invented certain new and useful Improvements in Cotton-Harvesters, of which the following is a specification.

This invention relates to certain new and useful improvements in machines designed for the harvesting of the cotton crop and the invention consists of the parts, and the constructions, arrangements and combinations of parts which I will hereinafter describe and claim.

A leading object of my present invention is to provide a machine, which is capable of operating upon two rows of standing cotton at the same time, and to economically harvest the cotton and deliver the same into a suitable receptacle.

Another object of the invention is to simplify a machine of the character described by reducing as much as possible the number of moving parts and to thereby lighten and cheapen the manufacture of the machine, and to increase the capacity of the machine by having the parts so arranged that a complete picking mechanism is provided at each side of the center of the machine, with the mechanism at one side capable of operating upon a row of cotton plants at that side and the mechanism at the opposite side of said machine being capable of operating upon another row of plants, the two mechanisms being driven in unison and by power derived from the pair of traction wheels upon which the machine is supported.

A further object of the invention is to improve the character of the picker mechanism whereby the same more effectually operates upon the plant to remove the ripe cotton.

In the accompanying drawings forming part of this specification and in which similar reference characters indicate like parts in the several views, Figure 1 is a top plan view of a cotton harvesting machine embodying the salient features of my invention. Fig. 2 is a longitudinal sectional view on the line 2—2 of Fig. 1. Fig. 3 is a horizontal sectional view on the line 3—3 of Fig. 2. Fig. 4 is an enlarged detail partially broken away of one of the vertical rods, 40, showing a series of picker spindles and co-acting rack bars, 45. Fig. 5 is a side elevation of Fig. 4. Fig. 6 is a plan view of the rack, 45, detached. Fig. 7 is a top plan view of one of the sprocket-wheels showing picker spindles and radially movable bars associated therewith. Fig. 8 is a bottom plan view of Fig. 7. Fig. 9 is a cross section of Fig. 7 on the line 9—9. Fig. 10 is a diagrammatic view showing a series of picker spindles and the several positions which they assume in passing around an end sprocket.

In my prior Patent No. 1,041,202, dated October 15, 1912, I have desclosed a cotton harvesting machine of the general type shown in the accompanying drawings, except that while the machine of the prior patent is supplied with a pair of endless carriers provided with picker mechanism which operates from opposite sides upon a single row of cotton plants, the present machine has the endless carriers so arranged that the picking devices operate upon rows of plants spaced apart and one disposed near each outer side of the machine, as I will hereinafter fully describe; that the picking mechanism is given a different arrangement from that of the former patent and is simplified by the omission of parts found in the prior application for giving the accelerated speed to the picking spindles; and that the picking devices have been simplified in character and are made more effective for their intended purpose.

In carrying out my invention, the various parts of the machine may receive power and actuation from the traction of the main or supporting wheels of the machine, and to this end, the traction wheels, 2, may be of any approved construction, whose tread surfaces will so engage the ground that as the machine is drawn thereover, the said wheels will be positively rotated and without liability to slippage.

In the illustrated embodiment of my invention, the traction wheels have hubs provided with sprocket-wheels, 3, and each of these wheels is designed to drive a smaller sprocket-wheel, 4, mounted on a horizontal transverse shaft, 5, extending across the top of the rear portion of the machine, each of said shafts, 5, being suitably journaled on the frame and said shafts being axially in line, and each shaft carrying a suitable slidable beveled gear, 6, connected to the shaft and meshing with a corresponding gear, 7, fixed to the upper end of a vertical shaft, 8, as shown in Fig. 1. The arrangement of this train of gearing may be varied without materially affecting the salient features of the present invention, and it will be understood that any of the well known equivalents for the gears and driving arrangement hereinbefore described, may be used without altering the scope of the invention.

The main supporting or traction wheels, 2, of which there is one on each side of the machine, are loosely mounted on the journal ends of a bent shaft, 9, which shaft is of arch-form and extends across the top of the machine slightly in rear of the center thereof, and it forms a support for the standard, 10, of the operator's seat and for such other adjuncts as a machine of this character might require, these various elements being suitably placed within the ready access of the operator.

The main frame, 11, may be of any suitable construction and material and is supported on the main shaft and by a single centrally placed steering wheel, 12, at the front end of the machine, said steering wheel, 12, being mounted in a yoke having a vertical spindle, 13, suitably mounted in an extension, 14, of the front of the main frame, and said spindle being suitably connected to the tongue, 15, of the machine, or otherwise, by which the wheel may be turned to change the direction of travel of the machine.

The main frame of the machine is designed to be rigid and as light as consistent with the work which a machine of this character is designed to perform. It may be constructed of angle-iron or of other appropriate material and it comprises side members, whose forward ends are connected by the front bar, 11', thus giving to the frame substantially a U-shaped form in plan view, the said front bar securing the extension, 14, to the frame.

As in my aforesaid application, the present machine will be provided with crank shafts, 16 and 17, extending transversely across the machine near the front and rear ends. The forward crank shaft, 16, has its ends bent downwardly and forwardly to form cranks, 16', provided with outturned journals which are pivotally mounted in bearings on the main frame.

The rear crank shaft, 17, is connected to the forward crank shaft by means of a connecting bar, 18, or other equivalent means, said rear shaft extending across the machine and the cranks of said rear shaft extending downwardly and forwardly and having journal ends pivotally mounted in one of the arms of U-shaped brackets or extensions, 19, secured to the main frame, as shown in Fig. 2. The main frame thus supports at its front and rear, the crank arms of the two parallel cross shafts, 16 and 17, which are connected to move in unison and to thereby raise and lower the supplemental or upper frame of the machine, in a manner substantially as disclosed in my aforesaid prior application, and which upper frame may consist of parallel and equal sides, 20, and parallel and equal ends, 21, said frame being in operation slightly inclined to the horizontal and said upper frame, also, having parallel bars, 22, appropriately spaced from the side bars of the frame and extending from front to rear cross-bar of said frame, said upper or supplemental frame being provided with suitable journal boxes in which the crank shafts, 16 and 17 are appropriately mounted.

The upper or supplemental frame may be of any suitable construction and of such dimensions as may be desired, and in order that the machine may be capable of operating upon parallel rows of growing cotton plants at the same time, I prefer to make the frame adjustable in width so as to compensate for the difference in width between such rows of plants. To this end I prefer to have the front and rear bars, 21, of the supplemental frame divided and with their meeting ends overlapping and provided with perforations, 23, adapted to receive suitable bolts, 24, with securing nuts whereby the width of the supplemental frame may be increased or diminished. This or an equivalent construction enables me to so adjust the width of the machine that the picking mechanism which is carried by the upper or supplemental frame may be adjusted relatively to the space between rows of growing plants, and that said mechanism may operatively engage and remove the cotton from each row and deliver the same into the center of the machine, as I will presently describe.

In order that the upper frame and its accessories may be held in any of the adjusted positions and at any desired vertical height relatively to the ground and the growing plants, I mount upon the upper frame suitable spring actuated latches, 25, adapted to engage holes formed in the segments, 26, Fig. 2, secured to the fixed lower frame in some appropriate manner, said spring latches being connected by rods, 27, or otherwise to a crank or lever, 28, suitably journaled in a support, 29, on the upper frame adjacent the seat of the operator, whereby the operation of the lever in one direction withdraws the spring actuated latches from their engagement with the perforated segments, 26, and unlocks the swinging upper frame from its connection with the lower frame and thereby permits the two crank shafts, 16 and 17, to turn about their journal ends and the upper frame and its various parts to be vertically adjusted. This locking mechanism is fully disclosed in my aforesaid application and it will be understood that the present invention is not limited to the mechanism described, but that any mechanism suitable for adjusting the vertical height of the upper or swinging frame, may be used without in any manner departing from the salient features of my invention.

By reason of the construction just referred to, it will be apparent that when the upper frame is unlocked from the rigid main frame and the operator presses downwardly on the front cross shaft, or a cross bar, 30, the two shafts, 16 and 17, will turn about their lower journal ends and the upper frame and its contained mechanism, which I will hereinafter describe, will be lowered relatively to the fixed main frame and to the cotton plants.

The upper frame may be lowered against the resistance of a suitable spring, 31, by the operator pressing downwardly upon some rigid part of the swinging frame, as for instance the cross bar, 30, thereof thereby holding the spring under tension so that when the locking mechanism is actuated to release the upper frame from its locked position with the main frame, the said spring reacts to elevate the upper frame in a manner substantially as disclosed in my aforesaid application, said spring having one end connected to the upper frame and the other end suitably connected to the main frame or to an extension thereof, as shown in Fig. 1.

The improved picking mechanism is well illustrated in Figs. 3, 4 and 5, and as this mechanism is duplicated at each side of the longitudinal center of the machine, a description of one of the mechanisms, or at least of the mechanism along one side of the center of the machine and which mechanism is designed to operate upon a row of plants at that side of the machine, will apply to the corresponding mechanism at the other side of said machine and which is designed to operate upon a row of plants at that side. Each of the picking mechanisms will include the vertical shafts, 32 and 8, appropriately journaled near the front and rear ends of the machine and substantially equidistant from the longitudinal center of the said machine, the lower ends of these shafts being stepped or journaled in any well known manner on or in the closed bottom, 33, of the vertically adjustable frame and which bottom is suitably supported and fixed to the vertical standards or supports, 34. The front vertical shafts have their upper ends appropriately mounted in bearings, 35, fixed to the cross-bar, 30, and the vertical shaft at the rear portion of the machine has fixed to it the beveled pinion, 7, which is engaged by the corresponding pinion, 6, on the transverse shaft, 5, which derives power from the traction wheels through the sprockets gears, 3 and 4, and connecting chain before mentioned, said rear vertical shaft having fixedly secured to its upper portion, near the top of the upper frame, a sprocket-wheel, 36, around which passes a suitable sprocket chain, 37, said chain extending forwardly and around the corresponding sprocket-wheel, 38, fixed to the upper end of the vertical shaft at the front portion of the frame whereby the shafts at opposite ends of the same side of the frame of the machine are rotated in unison in the same direction. There are corresponding sprocket-wheels, 36', 38' at the lower ends of the front and rear vertical shafts with a sprocket-chain, 39, passing around the same.

As in my aforesaid prior application, the upper and lower main sprocket chains, 37 and 39, are appropriately connected by vertically disposed rods or bars, 40, which form carriers for the picker-spindles which I will presently describe, the connection of the ends of these rods being such that the rods may swing horizontally about their end portions as an axis. These rods are vertically arranged and are spaced a suitable distance apart along the sprocket chains and as many of said rods may be used as desired.

The rods are transversely bored to receive the picking spindles and their adjuncts, the said spindles being arranged in vertical rows and as many of these rows of spindles may be used as may be thought advisable. Each picking mechanism includes a picking spindle, 41, of substantially tubular form; this tube may be closed at the outer end and the end pointed to facilitate the stripping of the cotton which has been gathered by the spindle, the tubular spindle being perforated throughout its length with the perforations, 42, extending radially from the walls of the tube and adapted to permit the projection therethrough of the bristles or fiber of a suitable brush material and which material may be interwoven or otherwise carried by a twisted wire or other holder which is passed into the tube so that the bristles or fiber will project through the perforations a sufficient distance to cause them to engage the cotton when revolved in contact therewith, and thus remove the cotton from the boll. By using twisted wire with fiber fixed to the coils thereof, it is quite evident that by rotation of the twisted wire in the spindle, the brush fiber may be projected or withdrawn, thus adjusting the length of the fiber which is exposed on the outside of the picker spindle. This arrangement as well as the countersinking of the outer ends of the holes in the perforations, 42, and which countersunk portion provides concavities into which the outer ends of the brush fiber may be bent in any and all directions without material injury to the fiber when stripping the spindle of an accumulated mass of picked cotton, is fully disclosed in my aforesaid application, and, therefore, forms no essential part of the present improvements, as any well known and appropriate type of picker spindle may be used in lieu of the specific one herein shown and described, except as the same is modified by the following description.

In practice, I prefer that the picker spindle shall extend through an appropriate bushing or sleeve, 43, fixed in the vertical rod or bar, 40, the spindle projecting beyond the opposite side of said bar and having upon its inner end a pinion or toothed wheel, 44. This wheel operates in connection with a suitable rack, 45, shown in detail in Figs. 4, 5 and 6, and which rack has greater width than the thickness of the wheel which it engages. There will be one of these racks for each row of picker spindles, the racks being arranged in vertical order as shown in Figs. 4 and 5, and said racks extending from one to the other of the front and rear sprocket wheels and having curved ends (Fig. 6) which are concentric with the axis of the vertical shafts, 8 and 32, said racks having outwardly projecting slotted lugs, 45', which are designed to straddle the vertical supports, 34, which in the present case are shown as being in the form of threaded rods adapted to operatively receive the nuts, 46, and which nuts are designed to securely clamp and hold between them the aforesaid lugs of the racks, whereby said racks are rigidly secured in place and to the upper or swinging frame without having their position altered relatively to the frame.

It will be observed that the picker-spindle pinions have their teeth beveled on all sides so that the teeth have practically a pyramidal form, and that the teeth of the rack bar and which teeth are herein shown in the form of cross rods, 47, (but which rods may represent any toothed structure capable of co-acting with the teeth of the pinions) have greater width than that of the pinion. This enables the pinion to have a transverse movement on and relatively to the rack-bar, which is desirable because of the position which the picker-spindle should assume when passing around that portion of the rack bar which is concentric with the vertical shafts.

It will be understood that during the travel of the picker spindles it is highly desirable that in their active position they should project horizontally across the plants as indicated in Figs. 1 and 3, and as the loaded spindles pass around the rear sprocket-wheels, and reach the rear central portion of the machine they progressively become tangent to the sprockets as they are passed through the stripper blades and are by the latter relieved of the accumulated cotton. In other words, the picker-spindles are designed to fold relatively to the sprocket chains and to this end the carrier rods or bars are designed to turn at their ends in these chains as the latter pass around the sprocket; in passing around the rear sprocket-wheel, 36, and toward the front of the machine, the picker-spindles are designed to remain in their folded position pointing rearwardly and inclined slightly to the line of travel of the sprocket chains. This position is maintained by the picker-spindles until just before the spindles reach the forward end of the machine at which point they are again righted by degrees, until they project substantially and radially in passing around the front sprockets so that they are in proper position to pass crosswise of the cotton plants; they will then be held in this position subject to a certain oscillation in a horizontal direction, which I will presently refer to.

To compensate for the necessary changes in the angle of the picker-spindles, as they pass around the sprockets, I arrange that portion of the rack bars which is substantially concentric with the vertical shafts with its teeth or projections tangent to the circle described by the sprocket-wheels, and, therefore, the rack bars should have greater width than the width of the picker-spindle pinion, 44, that said pinion may have a slight transverse sliding movement on the teeth, it being understood that the picker spindles are not held radially to the vertical shaft when passing therearound, but that they should be tangent to the shaft, when passing around the first sprocket-wheel, 38, and that their angle should be progressively changed so that when they come into the presence of the growing plants they will be in a position to project cross-wise thereof in a horizontal direction and will be held in this position during the period of their rotation, or while gathering the cotton, and which period commences just when the picker-spindles first enter the space represented between the parallel bars, 20 and 22, of the swinging frame and which is supposed to cover or overlie a row of growing plants, and which rotation of the spindles terminates as the spindles leave this space and the rack at the rear end of the machine, it being understood that the picker-spindles travel rearwardly as they pass along the outer sides of the frame and that they fold in the manner before described and travel forwardly in the central portion of the frame, as indicated in Fig. 1.

The arrangement is the same at both sides of the machine and consequently as the sprocket chains travel with their outer runs moving to the rear, the spindles are in operative position and are gathering cotton from two rows at the same time; the inner runs of the sprocket chains move together in the same direction in the central portion of the machine, and the picker spindles carried thereby are then in their folded inoperative position and moving toward the front end of the machine, at which latter place the picker spindles are successively unfolded and caused to assume the different angles preparatory to being again projected into the cotton plants. It is at this latter point, namely, the front end of the machine that the picker spindle pinions first engage the tangentially disposed teeth of the rack bar and it is here that the tangential arrangement of the teeth of the rack-bar is of importance, because as the spindles carry the pinions and as the angle of the picker spindles is constantly changed the angle of the rack-teeth is correspondingly changed so that the pinions will ride smoothly over the rack without any tendency to bind thereon during this ever changing inclination of the spindle. To facilitate this action I prefer that the teeth of the pinion shall be beveled from all sides, as indicated in Fig. 4.

It will be understood that the changes in the angle of the picker spindles occur during the time that the folded spindles are emerging from the central portion of the machine and operating across the front of the machine preparatory to entering the range of the growing plants and preliminary to the picker-spindle pinions first entering the rack and engaging the initial tangentially-arranged teeth thereof, and a mechanism for positively turning the spindles to different angles during their travel from the inoperative or idle to the operative or active position as just mentioned, is illustrated in Figs. 7 to 10 inclusive although I desire it known that I do not limit the invention to the specific spindle-adjusting mechanism therein shown as other mechanism of an equivalent character may be used without departing from the spirit of this part of the invention. However, the mechanism shown in said Figs. 7, 8, 9 and 10, is well suited for the purposes I have in view and I have illustrated the same as one embodiment of this phase of the improved machine, said mechanism comprising a two-armed member, 50, which is fixedly secured to the upper end of the vertical rod or bar, 40, which carries the picker-spindles, it being understood that each of these bars will be supplied with one of said members and that said member may have fixed to it a toothed collar, 51, which is designed to be engaged by radial rack-bars, 52, which in turn are slidably mounted on the under portion of the upper sprocket-wheels, 36—38.

The upper front sprocket-wheels carry a series of the horizontal lengthwise slidable rack-bars and there may be as many of these bars used on the sprocket as may be desired. In practice there will be preferably one of these bars to every other tooth of the sprocket chain, and each of the slidable bars has a short rack surface near its outer end and said outer end, beyond the rack surface, is slightly curved to form substantially a striking end, 53, which in the operation of the slidable bar is designed to engage a projection, 54, formed on the back of the toothed collar, 51, or on a portion of the collar opposite to that carrying the teeth, whereby as a picker-spindle emerges from the central portion of the machine, in its folded condition, the projection, 53, on the toothed collar is at the same time carried into the range of action of the end of a rack-bar carried by the sprocket-wheel, and as this rack-bar is moved outwardly by a suitable cam, 55, such as I will presently describe, the end of the rack-bar will first engage the projection on the toothed collar, and thus cause the collar and the vertical bar which it carries to partially rotate. This carries the picker-spindles of that vertical bar from their folded position to a different angle, and brings the toothed portion of the collars on that bar into engagement with the teeth on the radial bars, whereby as the radial rack-bars are further moved outwardly by passing around the stationary cam, 55, the toothed collars will be further rotated and the picker spindles will be carried to a still different angle, pointing more sharply outwardly until in passing about a quarter of the distance around the sprocket-wheel, the picker-spindles will have been turned through an arc of about 180 degrees, or will have been reversed from the position shown at the lower portion of Fig. 10, to the position shown at the left central part of said figure. During the further travel of the chain and passage of the radial bars around the cam, 55, the picker-spindles are again moved by the engagement of the rack-bar and collar so that by the time the spindles come into the presence of growing plants they will have been turned a little more than 180 degrees, and until they point outwardly and slightly to the rear. As the radially slidable bar is withdrawn by the action of its actuating cam, 55, the spindles will be rotated backwardly a short distance and until the teeth on the radial bar disengage the teeth on the collar, which at once disconnects the collar from the radially slidable toothed bar, and permits the picker-spindle pinion to immediately engage the straight portion of the rack, 45, and to be rotated by its engagement therewith during the travel of the picker-spindle from front to rear of the machine.

The radially slidable rack-bars are operated by suitable means as by the cam, 55, shown in Fig. 8, said cam having an arm, 56, by which it may be fixed to some stationary part, as the supplemental frame and having one part arranged to engage the inner end of the rack bar so as to project this bar outwardly and cause the rack teeth thereof to operatively engage and rotate the toothed collar which by being fixed to the vertical rod or bar, 40, which carries the picker-spindles of that particular series, rotates this bar and correspondingly moves the picker-spindles of the series carried by the bar, in a horizontal plane thus changing the angular position of the picker-spindles, said cam having a second portion, say in the form of an annular cam groove, adapted to engage the hook-shaped end of the rack-bar to withdraw this bar during the rotation of the sprocket and as the gradually reduced portion of the cam comes successively into engagement with the inner or hook-shaped end of the rack-bar. It will thus be seen that as the folded picker-spindles emerge from the central front portion of the machine, the vertical bar which carries the first set of spindles is brought into such position so that the toothed segment may be engaged and partially turned by the first of the radially movable rack-bars, the inner end of which bar is in engagement with a low portion of the cam, 55, and as this sprocket rotates the successively increasing portion of the cam surface acts upon the rack-bar and forces the same radially outwardly and thereby causes the teeth of the rack-bar to engage the teeth of the collar and thus partially rotate the collar and its attached vertical rod to cause the picker-spindle to be turned horizontally in an arc of a circle, thereby changing the inclination of the picker-spindles. As the sprocket continues to rotate the increasing portion of the cam surface progressively operates upon the radial slidable rack-bar and thus through this bar and the toothed collar which it engages, the angle of the picker-spindles carried thereby will be progressively changed until the bars arrive at the opposite side of the sprocket, in which position the picker-spindles will now project substantially at right angles to the travel of the sprocket chain and across the row of plants. It is just previous to this point that the picker-spindle pinions, 44, enter and engage the forward end of the rack-bars, 45, and it is because of the final shifting movement of the inclination of the spindles to reach the right angled position shown at 57, in Fig. 10, that I prefer to make the initial teeth in the curved end of the rack-bars, 45, tangent to the travel of the picker-spindle pinions and to make the racks wider than the width of the pinions and to bevel the teeth of the pinions to allow the pinions free movement without danger of binding, as said pinions travel over the curved portion of the rack-bars, 45, and before they reach the parallel teeth of said bars, over which the spindles now travel to the rear end of the machine, and during which travel they gather the cotton.

In passing around the rear sprocket wheel, 36, the picker-spindles are progressively folded by a similar arrangement of cam and rack-bar associated with the rear sprocket, the arrangement being similar to that shown in Fig. 8, and the purpose of the construction being to fold the picker-spindles toward each other so that as these spindles reach the inner side of the sprocket, 36, they point rearwardly and in this position they pass through suitable stripper plates, 60, by means of which the cotton adhering to the picker-spindles is stripped therefrom and falls upon the bottom of the central portion of the machine. This portion of the bottom may be in the form of a trough and in this trough operates a single plunger, 61, which has a connecting rod, 62, leading to a crank pin, 63, on a toothed wheel, 64, which is driven in any suitable manner to reciprocate the plunger over the floor of the machine and thus deliver charges of discharged cotton through the outlet at the rear of the machine. This outlet connects directly with the mouth end of a bag or other suitable receptacle, 65, fitted over the discharge end of the machine and adapted as a receiver for the picked cotton, said bag being supported upon a platform, 66, hingedly secured to the rear cross bar, of the upper frame of the machine and said platform having its rear end supported by means of rods, 67, or equivalent devices connected to a ring, 68, which is adapted to detachably engage a hook-shaped member, 69, secured to the rear cross-bar of said frame, as shown in Fig. 1.

As the picker-spindles often become entangled in the branches of a growing plant to such an extent that the branch is often broken and excessive strains are thrown upon the spindles, and twigs and litter due to torn leaves are sometimes carried with the cotton, to the point of deposit, I prefer in the present improvement, that the picker-spindle shall be constructed so that it will yield under a predetermined pressure or strain. To this end the pinion, 44, is loose upon the journal end of the spindle, and on the inner end of the spindle between the pinion and the vertical rod or bar, 40, is a compression spring, 70, the tension of which may be adjusted at all times by a suitable nut, 71, on the inner threaded end of the picker-spindle, as shown in Fig. 4.

Suitable washers are used between the nut and pinion and at each end of the spring, and by turning the nut and thereby adjusting the tension of the spring, the pinion will be held firmly to the picker-spindle under normal conditions, but when the picker-spindle meets an obstruction or a resistance, which is in excess of that of the tension of the spring, 70, the latter permits the pinion to turn relatively to the spindle as said pinion is traveling over the rack, until the obstruction is passed, or the resistance is reduced below the tension of the spring, when the parts return to normal position and the "dead" spindle may be again rotated by and in unison with the pinion. I thus provide a mechanism which is automatic in its operation and which will relieve the picker-spindles of excessive strains and will accordingly prolong the life of these important parts. It is also desirable that in their operating position the spindles shall be oscillated in a horizontal plane while operating through the plants, because by this movement the spindles have greater range of movement and are more effective in searching out the open bolls of cotton, and to this end I have shown in Fig. 3, a guide, 75, having an outer side of undulating form and which guide is positioned in the upper portion of the swinging frame of the machine just below and substantially under one of the longitudinal angle-beams, 22, of said frame.

Secured to the upper ends of the vertical bars or rods which carry the picker-spindles in series, are the arms, 50, having oppositely placed points, 77, which may be at the ends of intermediate curved surfaces, said arms adapted, as the picker-spindles enter the space occupied by the plants, to successively enter into engagement with the beginning of the cam surface of the guide with the points of the arms in engagement with said surface whereby as the points move over the undulating surface of the guide, the arms will be rocked and the vertical rods which carry the picker-spindles and which are fixed to the arms will be correspondingly rocked thereby oscillating the rotating spindles horizontally in the presence of the cotton during the travel of the picking mechanism from front to rear of the machine, or while the parts are in condition for gathering the cotton. As shown in Fig. 3, the cam guide has laterally projecting flanges which are clamped by nuts, 78, to the vertical uprights or standards, 34, to which are also clamped the rack-bars over which the picker-spindles operate.

From the foregoing it will be observed that I have designed a machine which is provided with two similar picking mechanisms operating in unison and each of which is designed to successfully remove cotton from a row of standing plants and at the same time each of the rotatable picker-spindles is caused to automatically adjust itself and its angle of inclination with respect to the growing plant so as to enter the same with as little damage to the plant and to the spindle as is possible, and that the spindles are given an oscillation, or in other words caused to range about in the plant to seek out the open bolls, during the travel of the picking-spindle from one end of the machine to the other, the mechanism carrying the spindles operating in the same direction, and the spindles of the two mechanism folding as they enter the rear central portion of the machine and adapted to deliver the picked cotton so that the same may be discharged into the receiver, 65, as before mentioned.

While I have shown and described in this application a specific form of picker-spindle mechanism, I do not claim the same herein, as this mechanism forms the subject matter of a separate application filed by me of even date herewith, Serial No. 717,029.

Having thus described my invention what I claim as new and desire to secure by Letters Patent is:—

1. A cotton harvester, comprising a frame, supporting wheels therefor, endless carriers mounted in the frame, and substantially horizontally-disposed, one of said carries being at each side of the center of the machine and each of the carriers having its outer run moving horizontally toward the rear of the machine, horizontally-disposed picker spindles movable with the carriers, means on the frame adjacent the outer run of the carriers for rotating said spindles, the spindles of one carrier operating upon one row of cotton plants at one side of the machine and outside of the outer run of a carrier, and the spindles of the outer run of the other carrier operating upon the plants of another row at the opposite side of the machine and outside of the outer run of the second-named carrier, stripping elements at the rear central portion of the machine toward which the loaded spindles of the two carriers approach from opposite sides, and means operating at the central portion of the machine for discharging the stripped cotton.

2. A cotton harvester, comprising a frame, supporting wheels therefor, endless carriers mounted in the frame and substantially horizontally-disposed, one of said carriers being at each side of the center of the machine and each of the carriers having its outer run moving horizontally toward the rear of said machine, horizontally-disposed picker spindles movable with the carriers, means on the frame adjacent the outer run of the carriers for rotating said spindles, the spindles of one carrier operating upon one row of cotton plants at one side of the machine and outside of the outer run of a carrier, and the spindles of the outer run of the other carrier operating upon the plants of another row at the opposite side of the machine and outside of the outer run of the second-named carrier, the spindles of the two carriers approaching each other from opposite directions toward the central portion of the machine, and means at the rear central portion of said machine for stripping the cotton from the spindle of said carriers.

3. A cotton harvester, comprising a frame and supporting wheels therefor, endless-carriers mounted in the frame, one at each side of the center thereof, means for operating the carriers, horizontally disposed picker-spindles movable with the carriers, and means adjacent the outer runs of the carriers for rotating the spindles carried thereby, the spindles of one carrier operating upon one row of cotton plants at one side of the machine and outside of the outer run of a carrier, and the spindles on the outer run of the other carrier operating upon the plants of another row at the opposite side of the machine and outside of the outer run of the second-named carrier, means for folding the spindles relatively to the carriers, as said spindles approach the center of the machine, and means for stripping the collected cotton from the spindles and delivering the same at the rear central portion of said machine.

4. A cotton harvester, comprising a frame and supporting wheels therefor, endless carriers mounted in the frame, one at each side of the center thereof, means for operating the carriers, and horizontally disposed rotatably mounted picker spindles movable with the carriers, the spindles of one carrier adapted to operate upon a row of cotton plants at one side of the center of the machine, and the spindles of the other carrier adapted to operate upon the plants of a row at the other side of the center of the machine, means including toothed wheels on the spindles and fixed racks over which said wheels travel, whereby said spindles are rotated, the spindles of the two carriers approaching each other at the center of the machine, means for folding the spindles relatively to the carriers as they approach the center of the machine, means for stripping the collected cotton from the spindles and delivering the same upon the central portion of the machine, a cotton discharger operating in the central portion of the machine upon the delivered cotton, and a receiver into which the cotton is delivered by said discharger.

5. A cotton harvester, comprising a frame and supporting wheels therefor, endless-carriers mounted in the frame having their outer runs moving toward the rear of the machine, and their inner runs moving toward the front, means for operating the carriers in unison, picker-spindles movable with the carriers, means adjacent the outer run of the carriers for rotating the picker-spindles carried thereby, the spindles of one carrier operating upon one row of cotton plants at one side of the machine and outside of the outer run of a carrier, and the spindles on the outer run of the other carrier operating upon the plants of another row at the opposite side of the machine and outside of the outer run of the second-named carrier, means adjacent the outer run of the carriers for holding the picker-spindles carried thereby projected radially and across the cotton plants during the travel of the outer run of the carriers toward the rear of the machine, means for changing the angle of the picker-spindles as the spindles of each carrier approach each other from opposite directions at the rear end of the machine, and means at the rear central portion of the machine and toward which the spindles of the two carriers approach from opposite directions, for stripping the collected cotton from the spindles of both carriers and delivering the same centrally of the machine.

6. A cotton harvester, comprising a frame and supporting wheels therefor, endless-carriers mounted in the frame having their outer runs moving toward the rear of the machine, and their inner runs moving toward the front, means for operating the carriers in unison, picker-spindles movable with the carriers, means adjacent the outer run of the carriers for rotating the picker-spindles carried thereby, the spindles of one carrier operating upon one row of cotton plants at one side of the machine and outside of the outer run of a carrier, and the spindles on the outer run of the other carrier operating upon the plants of another row at the opposite side of the machine and outside of the outer run of the second-named carrier, means adjacent the outer run of the carriers for holding the picker-spindles carried thereby projected radially and across the cotton plants during the travel of the outer run of the carriers toward the rear of the machine, means for changing the angle of the picker-spindles as the spindles of each carrier approach each other from opposite directions at the rear end of the machine, means at the rear central portion of the machine for stripping the collected cotton from the spindles of both carriers and delivering the same centrally of the machine, said spindles remaining in folded position as they are moved along the central portion of the machine toward the front end thereof, and means for progressively changing the angle of the picker spindles and unfolding the spindles relatively to the carriers as said spindles move around the front of the machine whereby the spindles enter crosswise of the plants.

7. A cotton harvester comprising a frame and supporting wheels, endless carriers mounted in the frame, one of said carriers being at each side of the center of the machine and each of said carriers having its outer run moving toward the rear of the machine, means for operating the carriers, picker-spindles movable with the carriers, means for rotating the spindles, said means comprising pinions on the inner end of the picker-spindles, vertical rods or bars in which the picker-spindles are mounted, said bars or rods being pivotally carried by said carriers, and horizontal racks disposed below and adjacent the outer runs of the carriers over which the pinions travel and by which they are rotated, said racks having end portions curving inwardly toward the center of the machine and provided with tangentially arranged teeth and having the portion intermediate of the ends provided with parallel teeth.

8. A cotton harvester comprising a frame and supporting wheels, endless carriers mounted in the frame, one at each side of the center of the frame, each of said carriers having its outer run moving toward the rear of the machine, means for operating the carriers, picker-spindles movable with the carriers, and means for rotating the spindles, said means comprising pinions on the inner end of the picker-spindles, vertical rods or bars in which the picker-spindles are mounted, said bars or rods being pivotally carried by said carriers, and horizontal racks below and adjacent the outer run of the carriers over which the pinions travel and by which they are rotated, while being carried by the outer run of the carrier toward the rear end of the machine, said racks having inwardly curved ends with tangentially arranged teeth and having the portion intermediate of the ends provided with parallel teeth, said rack being wider than the pinions, and said pinions having teeth beveled on all sides.

9. A cotton harvester comprising a frame and supporting wheels, picker-spindle carriers mounted in the frame, means for operating the carriers, rotatable picker-spindles movable with the carriers, and means disposed adjacent the outer run of the carriers for imparting a horizontal oscillation to the picker-spindles carried thereby coördinately with their rotation, whereby the spindles on the outer run of the carriers range about in the cotton plants while removing the cotton from the open bolls.

10. A cotton harvester comprising a frame and supporting wheels, picker-spindle carriers mounted in the frame, means for operating the carriers, rotatable picker spindles movable with the carriers, and a guide fixed to said frame adjacent the outer run of the carriers and having an undulating surface, said carriers comprising pivotally mounted vertical rods or bars in which the picker-spindles are carried, and said rods or bars having oppositely pointing fingers adapted to travel in engagement with the undulating surface of said guide whereby the picker-spindles on the outer run of the carriers are horizontally oscillated coördinately with their rotation to cause them to range about in the cotton plants.

11. In a cotton harvester having rotatable picker-spindles and supporting means therefor, means for imparting a horizontal oscillation to the spindles coördinately with their rotation and while they are operating in the cotton plant.

12. In a cotton harvester having rotatable picker-spindles and means for operating the same, said means including endless carriers and vertical rods carried thereby and turnably mounted therein, and in which rods the picker-spindles are mounted, an undulating guide, and oppositely pointing fingers carried by said vertical rods and engaging said guide whereby the rods are oscillated and the picker-spindles carried thereby are oscillated in a horizontal plane during their rotation and caused to range about in the cotton plant.

13. A cotton harvester comprising a supporting frame, endless-traveling carriers mounted therein, sprocket-wheels around which the carriers pass, picker-spindle supports pivotally mounted on the carriers so as to turn in a horizontal direction, picker-spindles carried by said supports, and means for turning the supports about their pivots to allow the spindles to fold and unfold relatively to the carriers, said means including radially movable bars on the sprocket-wheels and projections on the picker-spindle supports engaged by said bars as the supports pass around the sprocket wheels.

14. A cotton harvester comprising a supporting frame, an endless-traveling carrier mounted therein, front and rear sprocket-wheels around which the carrier passes, picker-spindle supports pivotally mounted on the carrier so as to turn in a horizontal direction, a series of picker-spindles carried by said supports, and means for turning the supports about their pivots, to allow the spindles to fold relatively to the carriers after said spindles have passed through the cotton plants and are passing around one of the sprocket-wheels, said means including radially movable bars on said sprocket-wheel and projections on the picker-spindle supports engaged by said bars as the supports pass around said sprocket wheel, and a stripper through which the spindles are drawn in their folded condition.

15. A cotton harvester comprising a supporting frame, an endless-traveling carrier mounted therein, front and rear sprocket-wheels around which the carrier passes, picker-spindle supports pivotally mounted on the carrier so as to turn in a horizontal direction, a series of picker-spindles carried by said supports, and means for turning the supports about their pivots to allow the spindles to fold relatively to the carriers after said spindles have passed through the cotton plants and are passing around the rear sprocket-wheel, said means including radially movable bars on the sprocket-wheels having shoulders near their outer ends, and projections on the picker-spindle supports engaged by said shoulders during the outward movement of said bars.

16. A cotton harvester comprising a supporting frame, an endless-traveling carrier mounted therein, front and rear sprocket-wheels around which the carrier passes, picker-spindle supports pivotally mounted on the carrier so as to turn in a horizontal direction, a series of picker-spindles carried by said supports, and means for turning the supports about their pivots to allow the spindles to fold relatively to the carriers after said spindles have passed through the cotton plants and are passing around the rear sprocket-wheel, said means including radially movable bars on the sprocket-wheels having shoulders near their outer ends and rack-teeth interior to the shoulders, said picker-spindle supports having projections engaged by said shoulders and having a segmental rack-portion engaged by the teeth of said bars.

17. A cotton harvester comprising a supporting frame, an endless-traveling carrier mounted therein, front and rear sprocket-wheels around which the carrier passes, picker-spindle supports pivotally mounted on the carrier so as to turn in a horizontal direction, a series of picker-spindles carried by said supports, and means for turning the supports about their pivots to allow the spindles to fold relatively to the carriers after said spindles have passed through the cotton plants and are passing around the rear sprocket-wheel, said means including radially movable rack-bars on the sprocket-wheel, toothed collars fixed to the ends of the picker-spindle supports adapted to be engaged by said rack-bars to rotate the supports and thereby change the angle of the picker-spindles, and means engaging the rack-bars for progressively projecting and withdrawing the bars during the passage of the carrier around said sprockets.

18. A cottom harvester comprising a supporting frame, an endless-traveling carrier mounted therein, front and rear sprocket-wheels around which the carrier passes, picker-spindle supports pivotally mounted on the carrier so as to turn in a horizontal direction, a series of picker-spindles carried by said supports, and means for turning the supports about their pivots, to allow the spindles to fold relatively to the carriers after said spindles have passed through the cotton plants, and are passing around the rear sprocket-wheel, said means including radially movable bars on the sprocket-wheels, means for projecting and withdrawing the radial bars as the carriers pass around one of the sprocket-wheels, said bars having rack-teeth and the picker-spindle supports having collars with teeth to be engaged by said rack-teeth, whereby the supports are rotated and the angle of the picker-spindles is changed and said spindles are operated so that they project substantially radial when entering the plant.

19. A cotton harvester comprising a supporting frame, an endless-traveling carrier mounted therein, front and rear sprocket-wheels around which the carrier passes, picker-spindle supports pivotally mounted on the carriers so as to turn in a horizontal direction, picker-spindles carried by said supports, means for folding the picker-spindles relatively to the carrier as they pass around the rear sprocket-wheel, a stripping mechanism through which the folded spindles pass and by which they are relieved of the adhering cotton, and means for unfolding the picker-spindles at the opposite end of the machine, said means including radially movable rack-bars carried by the sprocket-wheel at the last-named end of the machine, said bars and the picker-spindle supports having projections to be engaged by said bars to impart a preliminary turning motion to the supports, and said supports having, also, toothed portions engaged by said bars for completing the rotation and thereby altering the angle of the picker-spindles whereby the spindles project substantially radially from the carriers when entering the cotton plant.

20. A cotton harvester comprising a supporting frame, an endless-traveling carrier mounted therein, front and rear sprocket-wheels around which the carrier passes, picker-spindle supports pivotally mounted on the carriers so as to turn in a horizontal direction, picker-spindles carried by said supports, means for folding the picker-spindles relatively to the carrier as they pass around the rear sprocket-wheel, a stripping mechanism through which the folded spindles pass and by which they are relieved of the adhering cotton, and means for unfolding the picker-spindles at the opposite end of the machine, said means including radially movable rack-bars carried by the sprocket-wheel at the last-named end of the machine, said bars and the picker-spindle supports having projections to be engaged by said bars to impart a preliminary turning motion to the supports, and said supports having, also, toothed portions engaged by said bars for completing the rotation and thereby altering the angle of the picker-spindles whereby the spindles project substantially radially from the carriers when entering the cotton plant, and means engaging the inner ends of the radial bars for moving the bars in and out as they pass around said sprocket wheel.

In testimony whereof I affix my signature in presence of two witnesses.

LUCIUS L. UPSHAW.

Witnesses:
T. WALTER FOWLER,
C. W. FOWLER.